US010782517B2

(12) United States Patent
Lv

(10) Patent No.: US 10,782,517 B2
(45) Date of Patent: Sep. 22, 2020

(54) VIRTUAL DISPLAYING DEVICE FOR TELESCOPIC SIGHT

(71) Applicant: SHENZHEN GONGFENXIANG NETWORK TECHNOLOGY CO., LTD., Shenzhen (CN)

(72) Inventor: Liang Lv, Shenzhen (CN)

(73) Assignee: SHENZHEN GONGFENXIANG NETWORK TECHNOLOGY CO., LTD., Shenzhen (CN)

( * ) Notice: Subject to any disclaimer, the term of this patent is extended or adjusted under 35 U.S.C. 154(b) by 193 days.

(21) Appl. No.: 16/166,188

(22) Filed: Oct. 22, 2018

(65) Prior Publication Data
US 2019/0072754 A1 Mar. 7, 2019

Related U.S. Application Data

(63) Continuation of application No. PCT/CN2017/101654, filed on Sep. 13, 2017.

(30) Foreign Application Priority Data

Sep. 4, 2017 (CN) .......................... 2017 1 0787303

(51) Int. Cl.
G02B 23/00 (2006.01)
G02B 23/10 (2006.01)
(Continued)

(52) U.S. Cl.
CPC ............... G02B 23/10 (2013.01); F41G 1/38 (2013.01); G02B 23/105 (2013.01); G02B 23/16 (2013.01); F41G 1/30 (2013.01)

(58) Field of Classification Search
CPC ...... G02B 23/00; G02B 23/14; G02B 23/145; G02B 23/16; F41G 1/00; F41G 1/38;
(Continued)

(56) References Cited

U.S. PATENT DOCUMENTS 7,319,557 B2 *  1/2008  Tai ........................... F41G 1/32
                                                          359/350
7,409,792 B2 *  8/2008  Narcy .................... G02B 23/12
                                                           42/120
(Continued)

FOREIGN PATENT DOCUMENTS

CN       101221285 A     7/2008
CN       201145779 Y    11/2008
(Continued)

OTHER PUBLICATIONS

International Search Report for PCT/CN2017/101654, dated May 16, 2018.
(Continued)

Primary Examiner — Arnel C Lavarias

(57) ABSTRACT

A virtual displaying device used on a telescopic sight includes a sleeve sleeved around an eyepiece portion of the telescopic sight, a virtual assembly and a fixing portion for fixing the sleeve and the virtual assembly to the eyepiece portion. The virtual assembly includes a housing, a virtual member and a displaying screen both received in the housing. Light emitted from the displaying screen passes through the virtual member to be zoomed, shifted and then projected, together with light of the eyepiece, near distance of eye relief of the telescopic sight so that a shooter can simultaneously and clearly see both the target inside the eyepiece and contents displayed on the displaying screen. The present structure above can allow the shooter to obtain important shooting information while aiming at a target and greatly improve the efficiency of the telescopic sight.

11 Claims, 2 Drawing Sheets

(51) Int. Cl.
*F41G 1/38* (2006.01)
*G02B 23/16* (2006.01)
*F41G 1/30* (2006.01)

(58) Field of Classification Search
CPC ... F41G 1/387; F41G 1/40; F41G 1/41; F41G 1/42; F41G 1/46; F41G 1/473; F41G 3/06; F41G 11/00; F41G 11/001
USPC ....... 359/419, 362, 399, 400, 402, 420, 421, 359/422, 428, 432; 42/111, 118, 119, 42/120, 122, 124, 125, 130, 135
See application file for complete search history.

(56) References Cited

U.S. PATENT DOCUMENTS

| | | | |
|---|---|---|---|
| 9,411,148 B2 * | 8/2016 | Szapiel | G02B 23/10 |
| 9,817,225 B2 | 11/2017 | Gotz et al. | |
| 2014/0226002 A1 * | 8/2014 | Metzler | G06F 3/013 |
| | | | 348/78 |

FOREIGN PATENT DOCUMENTS

| | | | |
|---|---|---|---|
| CN | 102495464 A | 6/2012 |
| CN | 102879896 A | 1/2013 |
| CN | 103257432 A | 8/2013 |

OTHER PUBLICATIONS

Written Opinion of the International Searching Authority for PCT/CN2017/101654, dated May 24, 2018.

* cited by examiner

VIRTUAL DISPLAYING DEVICE FOR TELESCOPIC SIGHT

CROSS-REFERENCE TO RELATED APPLICATION

The present application is a continuation-application of International Application PCT/CN2017/101654, with an international filing date of Sep. 13, 2017, which claims foreign priority of Chinese Patent Application No. 201710787303.6, filed on Sep. 4, 2017 in the State Intellectual Property Office of China, the contents of all of which are hereby incorporated by reference the contents of all of which are hereby incorporated by reference.

BACKGROUND

1. Technical Field

The present disclosure generally relates to displaying device fields, and especially relates to a virtual displaying device used on a telescopic sight.

2. Description of Related Art

Rifle sights, especially the traditional telescopic sights, since its invention, had been widely used in sports, hunting and military activities for their viewing clarity and their accuracy to hit a target. In general, it is very difficult to hit a long distance target because of the curved trajectory of a bullet's path, which is formed by the joint effect of the gravity and wind. A shooter needs to measure the distance of the target, calculate a trajectory and adjust the turrets of the telescopic sight to achieve the long distance hit. However, to perform the above mentioned tasks require the shooter to remove his eyesight away from the target inside telescopic sight, and these time-consuming tasks keep the shooter's attention away from the battle or hunting field. In practice, the target is tended to be moving so that shooting opportunities can last only for a short time. Nowadays, the shooting technology has entered an age of artificial intelligence, many smart devices such as rangefinders, ballistic calculation mobile APPs, etc., had appeared. In this way, there are no displaying devices that allow the shooter to quickly and directly obtain distance of the target, ballistic information and other shooting information provided by other smart devices without removing his eyesight away from the target inside the telescopic sight while aiming at the target, thereby the shooting efficiency is greatly reduced.

It's quite impossible for the shooter to simultaneously and clearly see contents of the displaying screen while aiming at the target by simply positioning a displaying screen next to the eyepiece of the telescopic sight. Eye Relief is an important parameter of the telescopic sight, which is defined as the distance from the last surface of an eyepiece within which the user's eye can obtain the full viewing angle. If a viewer's eye is outside this distance, a reduced field of view will be obtained. The distance of eye relief of most telescopic sights is about 9 cm. The distance between the shooter's eye and the eyepiece of the telescopic sight is between 6 cm and 12 cm to allow the shooter to accurately aim a target. However, in such distance, the shooter neither can see the actual object within this distance, nor can see anything on a displaying screen.

SUMMARY

The technical problems to be solved: in view of the shortcomings of the related art, the present disclosure relates to a virtual displaying device used on a telescopic sight which can allow the shooter to obtain the shooting information of the telescopic sight and achieve an accurate target hit and greatly improve the efficiency of the telescopic sight.

The technical solution adopted for solving technical problems of the present disclosure is:

a virtual displaying device used on a telescopic sight, with the telescopic sight including an eyepiece and an eyepiece portion for receiving the eyepiece therein. The virtual displaying device includes a sleeve sleeved around the eyepiece portion of the telescopic sight, a virtual assembly and a fixing portion for fixing the sleeve and the virtual assembly to the eyepiece portion. The virtual assembly includes a housing, a virtual member and a displaying screen both received in the housing. Light emitted from the displaying screen passes through the virtual member to be zoomed, shifted and then projected, together with light of the eyepiece, near distance of eye relief of the telescopic sight so that a shooter can simultaneously and clearly see both the target inside the eyepiece and contents displayed on the displaying screen.

Wherein the virtual member includes a periscope prism set, a convex lens and a concave lens, light emitted from the displaying screen passing through the concave lens to be diverged, and then passing through the convex lens to be converged so that contents of the displaying screen can be clearly seen at distance of eye relief of the telescopic sight, light is finally shifted by two internal reflections of the periscope prism set and projected, together with light of the eyepiece, near distance of eye relief of the telescopic sight so that the shooter can simultaneously and clearly see both the target inside the eyepiece and contents displayed on the displaying screen.

Wherein the virtual member includes a first mirror, a second mirror, a convex lens and a concave lens; light emitted from the displaying screen passing through the concave lens to be diverged, and then passing through the convex lens to be converged so that contents of the displaying screen can be clearly seen at distance of eye relief of the telescopic sight, the light reflected from the first mirror to the second mirror and then reflected into the shooter's eye from the second mirror, the light thus shifted and then projected, together with light of the eyepiece, near distance of eye relief of the telescopic sight so that a shooter can simultaneously and clearly see both the target inside the eyepiece and contents displayed on the displaying screen.

Wherein the first mirror is installed in the housing, and the second mirror is received in the upper portion of the sleeve and formed between the eyepiece and the shooter and facing the first mirror, with the projection of the second mirror in the radial direction of the eyepiece partially overlapped with the eyepiece, a first angle between the first mirror and the horizontal line is 45 degree and a second angle between the second mirror and the horizontal line is 40 degree.

Wherein an overlapping distance between a lower end of the second mirror and a top edge of the eyepiece visible to the shooter along the radial direction of the eyepiece is between 2 mm and 8 mm.

Wherein the sleeve includes a first end close to the eyepiece portion, a second end opposite to the first end, and a plurality of gaps arranged at intervals along its axis direction thereof and extending from the first end to the second end to allow the sleeve to have a certain elasticity for engaging with the eyepiece portion with different outer diameters.

Wherein the second end includes a receiving frame protruding towards the housing and defining a receiving hole formed thereof, and the periscope prism set includes a first reflecting surface formed on the upper thereof, and a second reflecting surface formed opposite to the first reflecting surface and inserted into the receiving hole and formed between the eyepiece and the shooter to abut against the eyepiece so that the target in the eyepiece and contents displayed on the displaying screen can be seen simultaneously thus forming a combined image composed by the eyepiece and the second reflecting surface.

Wherein the housing includes an opening to allow the periscope prism set to pass through the opening and insert into the receiving hole so that the first reflecting surface of the periscope prism set is received in the housing; the light passing through the convex lens is reflected from the first reflecting surface to the second reflecting surface, and then is reflected into the shooter's eyesight from the second reflecting surface.

Wherein the fixing portion includes a fixing ring, a post formed on the upper of the fixing ring, and the housing is fixed to the post via an installing portion.

Wherein the installing portion includes a plurality of gaskets for adjusting the distance between the housing and the sleeve in the radial direction of the sleeve to achieve a suitable overlapping of the eyepiece and the projection of the second reflecting surface in the radial direction of the eyepiece.

Wherein a third angle between the first reflecting surface and the horizontal line is 45 degree, while a fourth angle between the second reflecting surface and the horizontal line is 50 degree.

The present disclosure provides the advantages as below.

The structure of the present disclosure can pass light emitted from the displaying screen through the virtual member to be zoomed and shifted and then projected, together with light of the eyepiece, near distance of eye relief of the telescopic sight so that a shooter can simultaneously and clearly see both the target inside the eyepiece and contents displayed on the displaying screen, and allow the shooter to obtain the shooting information of the telescopic sight while aiming at the target and achieve an accurate target hit and greatly improve the efficiency of the telescopic sight.

BRIEF DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

Figure 1:
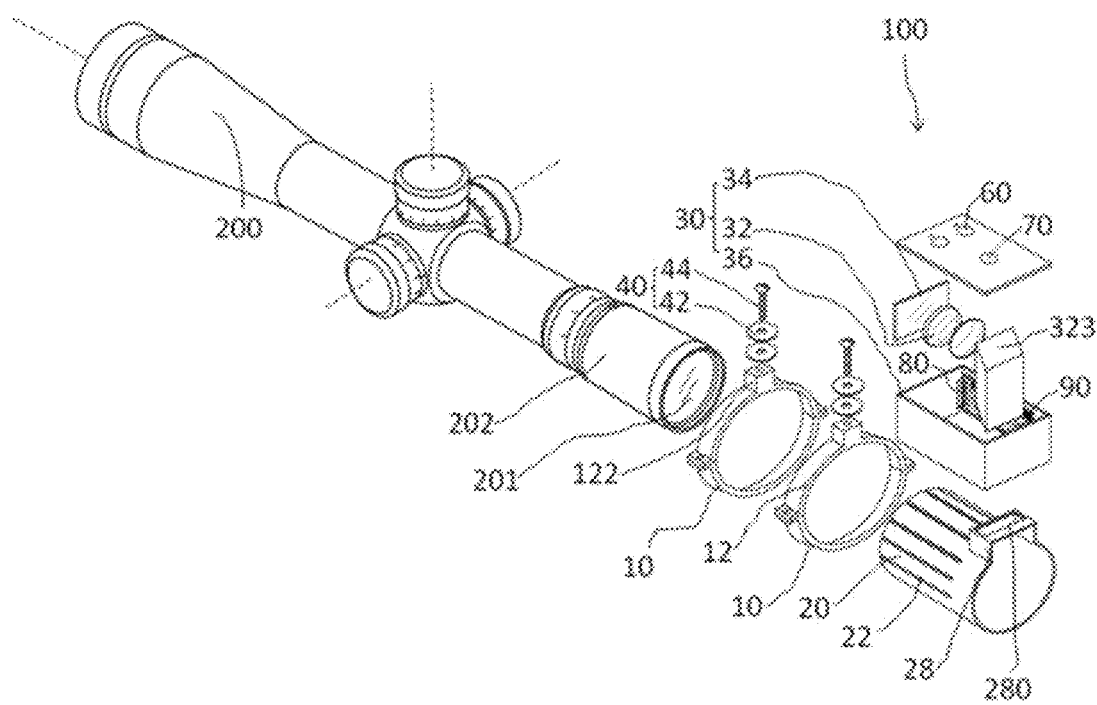
FIG. 1 is an exploded, schematic view of the virtual displaying device and a telescopic sight in accordance with a first exemplary embodiment.

The disclosure is illustrated by way of example and not by way of limitation in the figures of the accompanying drawings, in which like reference numerals indicate similar elements. According to the described exemplary embodiment of the present disclosure, all other embodiments obtained by one of ordinary skill in the related art without the need for a creative labor are within the protection scope of the present disclosure. Unless defined otherwise, the technical terms or scientific terms used for the present disclosure shall be a general meaning commonly understood by those having ordinary skill in the related art to which the present disclosure is applied.

In the description of the present disclosure, it needs to be understood that the terms mentioned below: "central", "longitudinal", "transverse", "length", "width", "thickness", "upper", "below", "front", "back", "left", "right", "vertical", "horizontal", "top", "bottom", "inner", "outer", "clockwise", "anticlockwise", etc, are shown in the specification of the present disclosure. The indicated orientation or position of the terms shown in the detailed description is based on the orientation or position shown in the figures of the accompanying drawings of the present disclosure, which is only to easily simplify the description of the present disclosure, but not indicated that the devices or elements of the present disclosure should have a particular orientation or should be designed and operated in a particular orientation. So the terms illustrated in the detail description are not by way of the limitation of the present disclosure.

In addition, the terms such as "first" and "second" shown in the specification are only used to describe, but not indicated that the elements of the present disclosure is important or represented the amount of the elements. That is, the features limited by the terms of "first" and "second" may explicitly or implicitly include one or more features. In the description of the present disclosure, the meaning of the term "a plurality of" is not less than two unless it is specifically illustrated.

In the present disclosure, except where specifically otherwise illustrated or limited, the terms "install", "connect", "link" and "fix" used herein should be understood in a broad perceive. Such as, the leaning may be tight connection, removable connection, or integrated connection. The meaning may also be mechanical connection, electrical connection, direct connection or indirect connection through intermediaries, or internal connection within two elements. The meaning of the terms used herein may be understood by one of ordinary skill in the related art according to specific conditions of the present disclosure.

Referring to FIG. 1, a virtual displaying device 100 used on a telescopic sight 200 in accordance with a first exemplary embodiment is provided. The telescopic sight 200 includes an eyepiece 201 and an eyepiece portion 202 for receiving the eyepiece 201 therein.

Figure 2:
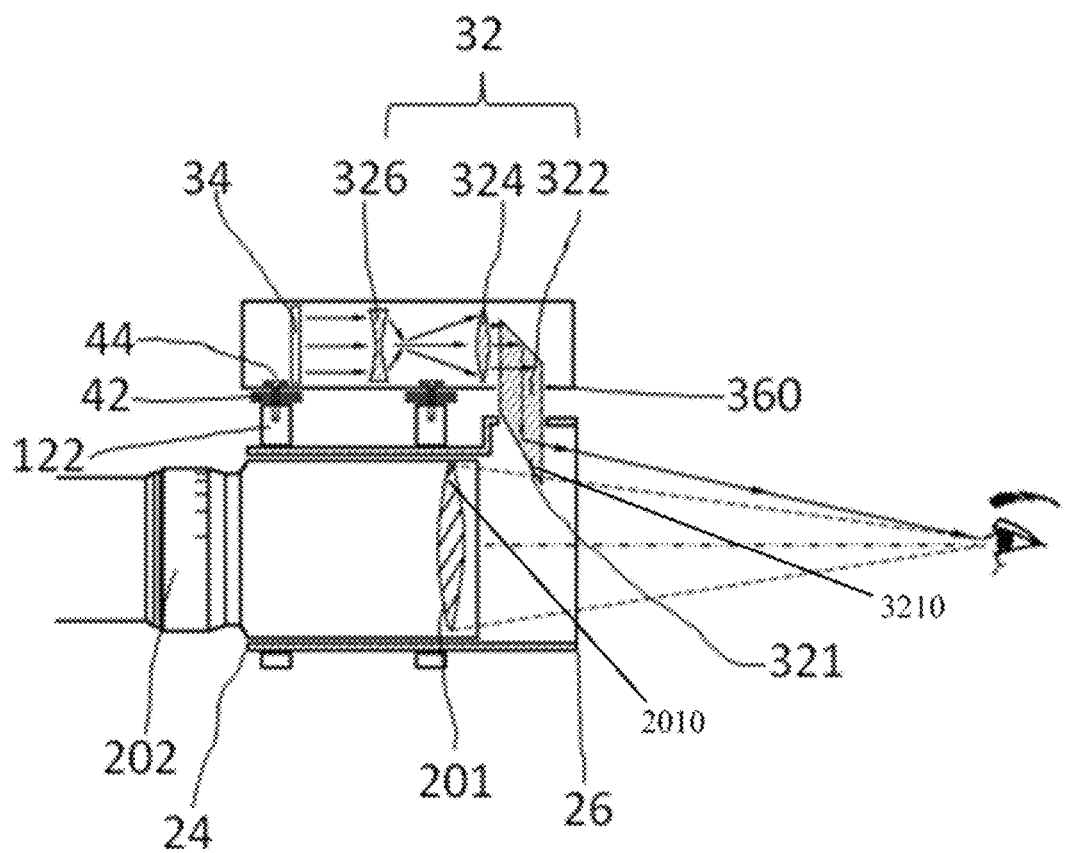
FIG. 2 is a cross-sectional assembly view of the virtual displaying device and an eyepiece of the telescopic sight of FIG. 1.

Referring to FIG. 1 and FIG. 2, the virtual displaying device 100 includes a sleeve 20 sleeved around the eyepiece portion 202 of the telescopic sight 200, a virtual assembly 30 and a fixing portion 10 for fixing the sleeve 20 and the virtual assembly 30 to the eyepiece portion 202. The virtual assembly 30 includes a housing 36, a virtual member 32 and a displaying screen 34 both received in the housing 36. Light emitted from the displaying screen 34 passes through the virtual member 32 to be zoomed and shifted and then is projected, together with light of the eyepiece 201, near distance of eye relief of the telescopic sight 200 so that the shooter can simultaneously and clearly see both the target inside the eyepiece 201 and contents displayed on the displaying screen 34.

In an exemplary embodiment of the present disclosure, the sleeve 20 is a circular tube. It can be understood that the sleeve 20 can be other shapes which can be engaged with the eyepiece portion 202. Furthermore, the shape of the sleeve 20 is coincided with that of the eyepiece portion 202 so that the sleeve 20 can be sleeved around the eyepiece portion 202 to further improve the convenience of use.

Light emitted from the displaying screen 34 passes through the virtual member 32 to be zoomed and shifted and then is projected, together with light of the eyepiece 201, near distance of eye relief of the telescopic sight 200 so that the shooter can simultaneously and clearly see both the target inside the eyepiece 201 and contents displayed on the displaying screen 34. In this way, the shooter can obtain the shooting information of the telescopic sight 200 while aiming at the target, such as the distance of the target, the shooting angle and other ballistic information. That is to say, when the virtual displaying device 100 of the present disclosure is mounted on the eyepiece 201 of the telescopic sight 200, the modern smart devices can connect to the virtual displaying device 100 that allows the shooter to measure the distance of the target, calculate a trajectory and adjust the turrets of the telescopic sight 200 while aiming at the target to achieve an accurate seamless connection of the smart devices and the conventional telescopic sight 200, thereby the shooting efficiency is greatly improved.

Furthermore, the virtual member 32 includes a periscope prism set 322, a convex lens 324 and a concave lens 326. Light emitted from the displaying screen 34 passes through the concave lens 324 to be diverged, and then passes through the convex lens 326 be converged so that contents of the displaying screen 34 can be clearly seen at distance of eye relief of the telescopic sight 200. Light is finally shifted by two internal reflections of the periscope prism set 322 and projected, together with light of the eyepiece 201, near distance of eye relief of the telescopic sight 200 so that the shooter can simultaneously and clearly see both the target inside the eyepiece 201 and contents displayed on the displaying screen 34.

The concave lens 326 and the convex lens 324 cooperatively forms a lens combination that not only allows the shooter to zoom in and zoom out to get a comfortable visual on the contents of the displaying screen 34, but also allows all kinds of displaying screens with different sizes and specifications to be used in the virtual displaying device 100 of the present disclosure, thereby the versatility and convenience of use is greatly improved.

Referring to FIG. 1, the sleeve 20 includes a first end 24 formed close to the eyepiece portion 202, a second end 26 opposite to the first end 24, and a plurality of gaps 22 arranged at intervals along its axis direction thereof and extending from the first end 24 to the second end 26 to allow the sleeve 20 to have a certain elasticity for engaging with the eyepiece portion 202 with different outer diameters.

The plurality of gaps 22 is arranged at intervals along the axis direction of the sleeve 20 so that the sleeve 20 can be expanded to sleeve around the eyepiece portion 202 with different specifications, thereby the versatility and convenience of use is greatly improved.

In an exemplary embodiment of the present disclosure, the plurality of gaps 22 is arranged parallel to each other.

Furthermore, the second end 26 of the sleeve 20 includes a receiving frame 28 protruding towards the housing 36 and defining a receiving hole 280 formed thereof. The periscope prism set 322 includes a first reflecting surface 323 formed on the upper thereof, and a second reflecting surface 321 formed opposite to the first reflecting surface 323 and inserted into the receiving hole 280 and formed between the eyepiece 201 and the shooter to abut against the eyepiece 201 so that the target in the eyepiece 201 and contents displayed on the displaying screen 34 can be seen simultaneously thus forming a combined image composed by the eyepiece 201 and the second reflecting surface 321.

In an exemplary embodiment of the present disclosure, the second reflecting surface 321 of the periscope prism set 322 is also an eyepiece.

Because the second reflecting surface 321 is inserted into the receiving hole 280 and abutted against the eyepiece 201 so that the projection of the second reflecting surface 321 in the radial direction of the eyepiece 201 is partially overlapped with the eyepiece 201 to achieve the combined image effect composed by the eyepiece 201 and the second reflecting surface 321. In this way, the shooter can simultaneously and clearly see both the target inside the eyepiece 201 and contents displayed on the displaying screen 34 to obtain the shooting information of the telescopic sight 100 while aiming at the target to achieve an accurate target hit and greatly improve the efficiency of the telescopic sight 100.

Furthermore, the housing 36 includes an opening 360 to allow the periscope prism set 322 to pass through the opening 360 and insert into the receiving hole 280 so that the first reflecting surface 323 of the periscope prism set 322 is received in the housing 36. The light passing through the convex lens 324 is reflected from the first reflecting surface 321 to the second reflecting surface 323, and then is reflected into the shooter's eye from the second reflecting surface 321.

Referring to FIG. 1 and FIG. 2, the fixing portion 10 includes a fixing ring 12 and the housing 36 is fixed to the fixing ring 12 via an installing portion 40.

In exemplary embodiment of the present disclosure, there is a pair of fixing rings 12. Each fixing ring 12 includes a pair of half rings fixed to each other by screws.

Furthermore, a post 122 is formed on the upper of the fixing ring 12 to engage with the housing 36. The installing portion 40 includes a plurality of gaskets 42 for adjusting the distance between the housing 36 and the sleeve 20 in the radial direction of the sleeve 20 to achieve a suitable overlapping of the eyepiece 201 and the projection of the second reflecting surface 321 in the radial direction of the eyepiece 201.

In an exemplary embodiment of the present disclosure, the installing portion 40 further includes a screw 44, together with the gaskets 42, for fixing the housing 36 tee the fixing ring 12.

In an exemplary embodiment of the present disclosure, there is a plurality of gaskets 42 or the gaskets 42 are elastic. When the gaskets 42 are non-elastic, the distance between the housing 36 and the sleeve 20 in the radial direction of the eyepiece 201 can be adjusted via changing the amount of the gasket 42 to achieve a suitable overlapping of the eyepiece 201 and the projection of the second reflecting surface 321 in the radial direction of the eyepiece 201. In addition, when the gaskets 42 are elastic, the distance between the housing 36 and the sleeve 20 in the radial direction of the eyepiece 201 can be adjusted via pressing the gasket 42 on the post 122 to achieve a suitable overlapping of the eyepiece 201 and the projection of the second reflecting surface 321 in the radial direction of the eyepiece 201. That is to say, a suitable distance and a suitable angle between the eyepiece 201 and the second reflecting surface 321 can be obtained by adjusting the gaskets 42 to allow the shooter to simultaneously see the contents both in the eyepiece 201 and the second reflecting surface 321.

Furthermore, the actual angle of view is narrow when the shooter is aiming at the target. In this condition, the shooter can't see any contents if the distance between the lower end 3210 of the second reflecting surface 321 and the top edge 2010 of the eyepiece 201 in the radial direction of the eyepiece 201 is too wide. While, the eyepiece 201 will be shaded by the second reflecting surface 321 if the projection of the second reflecting surface 321 in the radial direction of the eyepiece 201 overlaps with the eyepiece 201 too much. In an exemplary embodiment of the present disclosure, the overlapping distance between the lower end 3210 of the second reflecting surface 321 and the top edge 2010 of the eyepiece 201 in the radial direction of the eyepiece 201 is between 2 mm and 8 mm so that the shooter can simultaneously see the contents both in the eyepiece 201 and the second reflecting surface 321.

Because the distance between the lower end 3210 of the second reflecting surface 321 and the top edge 2010 of the eyepiece 201 in the radial direction of the eyepiece 201 can be adjusted that both the installation position of the periscope prism set 322 and the thickness of the second reflecting surface 321 can also be adjusted. In this way, the production and installation requirements of the periscope prism set 322 are reduced, thereby the convenience of use is greatly improved, and the cost of manufacture and installation is also reduced.

In an exemplary embodiment of the present disclosure, a third angle between the first reflecting surface and the horizontal line is 45 degree, while a fourth angle between the second reflecting surface and the horizontal line is 50 degree. The displaying screen 34 can be a dot-dot-matrix screen or a segment-code screen or other type screens.

Referring to FIG. 1, the virtual assembly 30 further includes an adjusting knob 60, a switching knob 70, an interface 80 and a PCB 90. Both the adjusting knob 60 and the switching knob 70 are mounted on the upper side of the housing 36 and electrically connected to the PCB 90, the interface 80 is electrically connected to the PCB 90 and the PCB 90 is mounted on the housing 36. The PCB 90 is configured to modulate phase, peak and frequency of potential signals on electrodes of the displaying screen 34 to establish a driven electric field of the displaying screen 34. The interface 80 is configured to input power and different video signals from external devices so that the content of the displaying screen 34 can be shown. The switching knob 70 is configured to turn on or turn off the displaying screen 34. The adjusting knob 60 is configured to adjust brightness of the displaying screen 34 that allows the shooter to clearly see the contents displayed on the displaying screen 34 in different external environments.

Referring to FIG. 1 and FIG. 2, when assembling the virtual displaying device 100, the periscope prism set 322, the convex lens 324, the concave lens 326 and the displaying screen 34 all are first installed in the housing 36 to cooperatively form the virtual assembly 30. Then, the sleeve 20 is sleeved around the eyepiece 201 by the fixing ring 12, and the virtual assembly 30 is also fixed to the fixing ring 12 by the installation portion 40, thereby the fixed portion 10, the sleeve 20 and the virtual assembly 30 are installed to form the virtual display device 100 to engage with the eyepiece 201 of the telescopic sight 200.

Figure 3:
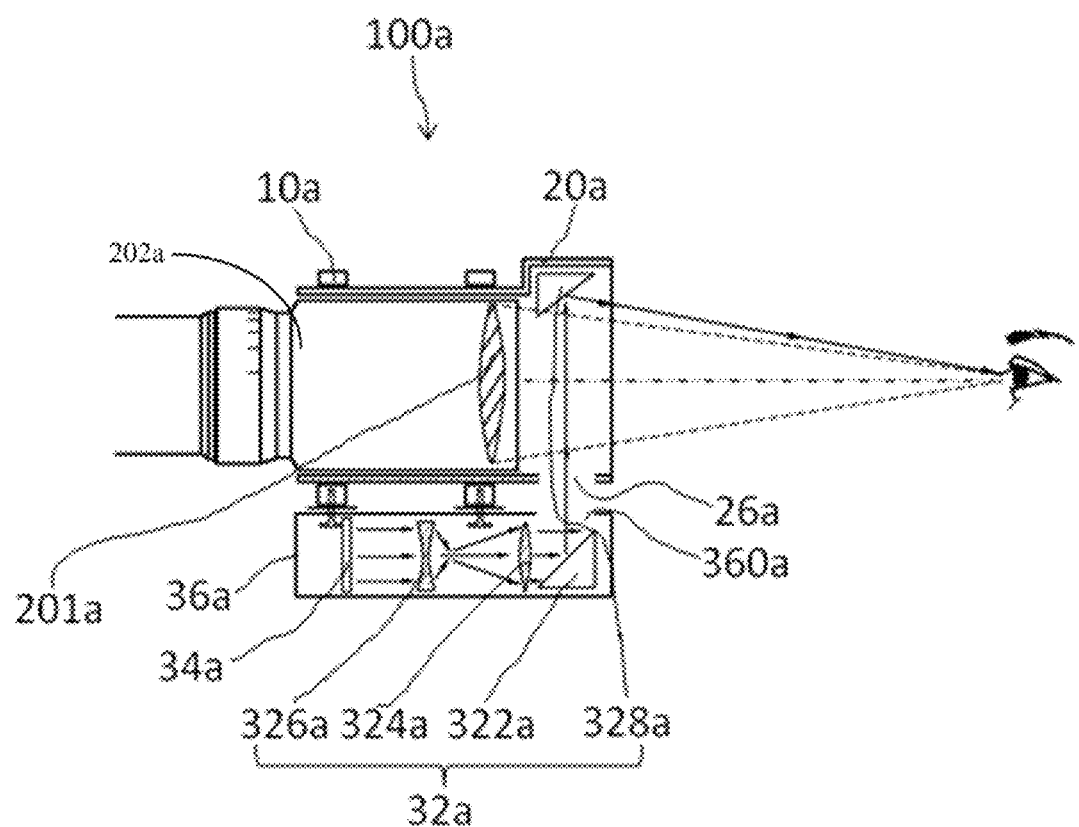
FIG. 3 is a cross-sectional assembly view of the virtual displaying device and an eyepiece of the telescopic sight in accordance with a second exemplary embodiment.

Referring to FIG. 3, a virtual displaying device 100a in accordance with a second exemplary embodiment is provided. In the second exemplary embodiment, the structure and function of the virtual displaying device 100a is similar to that of the virtual displaying device 100 of the first exemplary embodiment. While, the structure of the fixing portion 10a and the sleeve 20a is similar to that of the fixing portion 10 and the sleeve 20 of the first exemplary embodiment, and the function of the fixing portion 10a and the sleeve 20a is same as that of the first exemplary embodiment.

In the second exemplary embodiment of the present disclosure, the virtual assembly 30a includes a convex lens 324a, a concave lens 326a, a first mirror 322a and a second mirror 328a. All the first mirror 322a, the convex lens 324a and the concave lens 326a are received in the housing 36a, with the housing 36a being installed on the bottom of the sleeve 20. The second mirror 328a is received in the upper portion of the sleeve 20a and formed between the eyepiece 201 and the shooter to facing the first mirror 322a. The projection of the second mirror 328a in the radial direction of the eyepiece 201 is partially overlapped with the eyepiece 201. Light emitted from the displaying screen 34a passes through the concave lens 326a to be diverged, and then passing through the convex lens 324a to be converged so that contents of the displaying screen 34a can be clearly seen at distance of eye relief of the telescopic sight 200. Then, the light is reflected from the first mirror 322a to the second mirror 328a and reflected into the shooter's eyesight from the second mirror 328a, so the light is shifted and projected, together with light of the eyepiece 201a, near distance of eye relief of the telescopic sight 200a so that the shooter can simultaneously and clearly see both the target inside the eyepiece 201a and contents displayed on the displaying screen 34a. The housing 36a is installed on the bottom of the eyepiece 201a, that is, the housing 36a is located in the gap between the gun and the telescopic sight 200a. Thus, such design of the virtual displaying device 100 does not need to increase the volume of the weapon and greatly improve the convenience of use of the telescopic sight.

In an exemplary embodiment of the present disclosure, a first angle between the first mirror 322a and the horizontal line is 45 degree and a second angle between the second mirror 328a and the horizontal line is 40 degree.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A virtual displaying device used on a telescopic sight, the telescopic sight comprising an eyepiece and an eyepiece portion for receiving the eyepiece therein, the virtual displaying device comprising:
   a fixing portion;
   a sleeve sleeved around the eyepiece portion of the telescopic sight by the fixing portion;
   a virtual assembly fixed to the eyepiece portion by the fixing portion and comprising a housing, a virtual member and a displaying screen both received in the housing; and wherein light emitted from the displaying screen passes through the virtual member to be zoomed and shifted and then projected, together with light of the eyepiece, near distance of eye relief of the telescopic sight so that a shooter can simultaneously and clearly see both a target inside the eyepiece and contents displayed on the displaying screen.

2. The virtual displaying device as claimed in claim 1, wherein the virtual member comprises a periscope prism set, a convex lens and a concave lens, light emitted from the displaying screen passing through the concave lens to be diverged, and then passing through the convex lens to be converged so that contents of the displaying screen can be clearly seen at distance of eye relief of the telescopic sight, light is finally shifted by two internal reflections of the periscope prism set and projected, together with light of the eyepiece, near distance of eye relief of the telescopic sight so that the shooter can simultaneously and clearly see both the target inside the eyepiece and contents displayed on the displaying screen.

3. The virtual displaying device as claimed in claim 1, wherein the virtual member comprises a first mirror, a second mirror, a convex lens and a concave lens; light emitted from the displaying screen passing through the concave lens to be diverged, and then passing through the convex lens to be converged so that contents of the displaying screen can be clearly seen at distance of eye relief of the telescopic sight, the light reflected from the first mirror to the second mirror and then reflected into the shooter's eye from the second mirror, and finally shifted and projected, together with light of the eyepiece, near distance of eye relief of the telescopic sight so that the shooter can simultaneously and clearly see both the target inside the eyepiece and contents displayed on the displaying screen.

4. The virtual displaying device as claimed in claim 3, wherein the first mirror is installed in the housing, and the second mirror is received in an upper portion of the sleeve and formed between the eyepiece and the shooter and facing the first mirror, with a projection of the second mirror in a radial direction of the eyepiece partially overlapped with the eyepiece, a first angle between the first mirror and the horizontal line is 45 degrees and a second angle between the second mirror and a horizontal line is 40 degrees.

5. The virtual displaying device as claimed in claim 2, wherein the sleeve comprises a first end close to the eyepiece portion, a second end opposite to the first end, and a plurality of gaps arranged at intervals along its axis direction thereof and extending from the first end to the second end to allow the sleeve to have a certain elasticity for engaging with the eyepiece portion with different outer diameters.

6. The virtual displaying device as claimed in claim 5, wherein the second end comprises a receiving frame protruding towards the housing and defining a receiving hole formed thereof, and the periscope prism set comprises a first reflecting surface formed on an upper thereof, and a second reflecting surface formed opposite to the first reflecting surface and inserted into the receiving hole and formed between the eyepiece and the shooter to abut against the eyepiece so that the target in the eyepiece and contents displayed on the displaying screen can be seen simultaneously thus forming a combined image composed by the eyepiece and the second reflecting surface.

7. The virtual displaying device as claimed in claim 6, wherein the housing comprises an opening to allow the periscope prism set to pass through the opening and insert into the receiving hole so that the first reflecting surface of the periscope prism set is received in the housing; the light passing through the convex lens is reflected from the first reflecting surface to the second reflecting surface, and then is reflected into the shooter's eye from the second reflecting surface.

8. The virtual displaying device as claimed in claim 1, wherein the fixing portion comprises a fixing ring, a post formed on an upper of the fixing ring, and the housing is fixed to the post via an installing portion.

9. The virtual displaying device as claimed in claim 8, wherein the installing portion comprises a plurality of gaskets for adjusting a distance between the housing and the sleeve in a radial direction of the sleeve to achieve a suitable overlapping of the eyepiece and a projection of the second reflecting surface in a radial direction of the eyepiece.

10. The virtual displaying device as claimed in claim 7, wherein a third angle between the first reflecting surface and a horizontal line is 45 degrees, while a fourth angle between the second reflecting surface and the horizontal line is 50 degrees.

11. The virtual displaying device as claimed in claim 4, wherein an overlapping distance between a lower end of the second mirror and a top edge of the eyepiece visible to the shooter along the radial direction of the eyepiece is between 2 mm and 8 mm.

\* \* \* \* \*